United States Patent
Callaghan

(10) Patent No.: US 11,003,846 B2
(45) Date of Patent: *May 11, 2021

(54) SMARTER COPY/PASTE

(71) Applicant: Microsoft Technology Licensing, LLC, Redmond, WA (US)

(72) Inventor: David Michael Callaghan, Duvall, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/519,113

(22) Filed: Jul. 23, 2019

(65) Prior Publication Data

US 2019/0347320 A1   Nov. 14, 2019

Related U.S. Application Data

(63) Continuation of application No. 15/479,630, filed on Apr. 5, 2017, now Pat. No. 10,372,810.

(51) Int. Cl.
| | | |
|---|---|---|
| G06F 17/00 | (2019.01) | |
| G06F 40/18 | (2020.01) | |
| G06F 9/54 | (2006.01) | |
| G06F 40/166 | (2020.01) | |
| G06F 40/177 | (2020.01) | |
| G06F 3/0484 | (2013.01) | |

(52) U.S. Cl.
CPC .............. *G06F 40/18* (2020.01); *G06F 9/543* (2013.01); *G06F 40/166* (2020.01); *G06F 40/177* (2020.01); *G06F 3/04842* (2013.01)

(58) Field of Classification Search
CPC ...... G06F 40/18; G06F 40/166; G06F 40/177; G06F 9/543
USPC ......................................................... 715/220
See application file for complete search history.

(56) References Cited

U.S. PATENT DOCUMENTS

| | | | | |
|---|---|---|---|---|
| 9,798,889 | B1* | 10/2017 | Karpel | G06F 40/18 |
| 2002/0174140 | A1* | 11/2002 | Peake, Jr. | G06F 16/168 |
| 2004/0120339 | A1* | 6/2004 | Ronciak | H04L 49/901 |
| | | | | 370/429 |
| 2006/0022048 | A1* | 2/2006 | Johnson | H04L 67/18 |
| | | | | 235/462.1 |
| 2006/0212469 | A1* | 9/2006 | Babanov | G06F 40/169 |

(Continued)

OTHER PUBLICATIONS

Stylos et al., Citrine: Providing Intelligent Copy-and-Paste, ACM 2004, pp. 185-188. (Year: 2004).*

*Primary Examiner* — Shahid K Khan

(57) ABSTRACT

Various embodiments of the present technology generally relate to smarter copy and paste tools. More specifically, some embodiments relate to an intelligent cut and paste tool that includes functionality for tables where headers/labels are automatically determined and incorporated in the copied cells even if those headers/labels were not selected for copying. For example, in response to a request to copy selected data within the first table, a set of corresponding cells that includes labeling information for the data from the one or more cells can be identified. Once identified, the labeling information and the selected data can be copied to a clipboard. Then, in response to a request to paste the data from the clipboard, a second table can be created having cells that include the labeling information and the selected data.

20 Claims, 8 Drawing Sheets

(56) References Cited

U.S. PATENT DOCUMENTS

| | | | |
|---|---|---|---|
| 2006/0218492 A1* | 9/2006 | Andrade | G06F 40/166 715/234 |
| 2011/0209048 A1* | 8/2011 | Scott | G06F 40/18 715/236 |
| 2012/0089562 A1* | 4/2012 | Deremigio | G06F 16/254 707/602 |
| 2013/0124957 A1* | 5/2013 | Oppenheimer | G06F 16/903 715/212 |
| 2013/0151939 A1* | 6/2013 | Proux | G06F 40/18 715/212 |
| 2016/0112509 A1* | 4/2016 | Tracht | H04L 12/1863 709/217 |
| 2018/0181378 A1* | 6/2018 | Bakman | G06F 8/34 |
| 2019/0138589 A1* | 5/2019 | Udell | G06F 40/169 |

* cited by examiner

SMARTER COPY/PASTE

CROSS-REFERENCE TO APPLICATION

This application is a continuation of, and claims priority to, U.S. Non-Provisional patent application Ser. No. 15/479,630 filed Apr. 5, 2017, titled "SMARTER COPY/PASTE," which is incorporated herein by reference in their entirety for all purposes.

BACKGROUND

Many users of electronic devices routinely utilize some type of personal productivity software that often includes a variety software applications. These software applications can include word processors, spreadsheet applications, e-mail clients, notetaking software, presentation applications, and others. The applications available in these software suites are often used by individuals in school and business to create documents, presentations, and various reports. These applications can also be used to perform calculations, produce charts, organize data, receive and send e-mails, and the like.

In many cases, users are copying portions of data within one of the software applications and pasting that data to a new location within the same or different software application. However, quickly copying portions of tables can leave subsequent readers without context for the data provided by headers because copying and pasting the interior cells of a table does not include the column headers that often provide important metadata or context labeling of the table's content or data values. The contents of a spreadsheet, for example, can be the output of a function whose inputs and therefore the meaning of the value may get lost when it is pasted to a destination application such as a word processor text document or another spreadsheet. Traditionally, in order to resolve this issue, users often have to manually add in additional headers to the pasted data or subsequently copy and paste the headers in addition to the data. These multiple copy and paste steps and possibly additional formatting and labeling operations to describe the data make the task difficult.

Overall, the examples herein of some prior or related systems and their associated limitations are intended to be illustrative and not exclusive. Upon reading the following, other limitations of existing or prior systems will become apparent to those of skill in the art.

Overview

Various embodiments of the present technology generally relate to systems and methods for copying and pasting data. More specifically, some embodiments provide for improved systems and methods for implementing improved copy and paste features. In some embodiments, a method for copying and pasting data from a first table can include identifying, in response to a request to copy data from one or more cells selected by a user within the first table, a set of corresponding cells within the first table that includes labeling information for the data from the one or more cells. The labeling information or header cells in the first table may be identified by their different formatting than the other cells identified in the copy request. Additional information such as, but not limited to, location (such as top row of a column of data, the left most position of a row of data, or above a divider, etc.), colors, font size, font weight, font style, cell shading, extensible markup language (XML) metadata information, hypertext markup language (HTML) tags, and other data or cell characters or information about the meaning of the data in the first application may be used to identify headers.

Some applications may organize memory to store table data and table header information in such a manner that it is easy to retrieve the different data and header values programmatically. Some embodiments may use an object-oriented design that enables software applications to interact with the data values stored in a table object which is an in-memory model or virtual representation of the table of data with optional header information. The table object may provide member variables and methods that facilitate storing and accessing specific data cells and header information. If a piece of data being copied is the output of a function, such as the value from the bottom of a table showing the sum of a column of data, that application can dynamically generate a header or description of the data value and make it available when it is pasted into a destination document.

Once identified, the set of corresponding cells with the labeling information and the data from the one or more cells can be copied to a clipboard. In response to a request to paste the data from the clipboard, a second table can be created having cells that include the set of cells with the labeling information and the data from the one or more cells within the first table. The set of cells with the labeling information may be positioned so that the labeling information (e.g., the headers) are adjacent to the data from the one or more cells pasted from the first table.

In some embodiments, in response to the request to paste, a graphical user interface can be generated and displayed on a client device. The graphical user interface can include multiple pasting options. For example, a first option to paste can include the set of cells with the labeling information and the data from the one or more cells within the first table while a second option to paste can create a table with only the data from the one or more cells within the first table that were selected by the user. When pasting data from a source table into a destination table, the user interface may automatically resolve which header to use, or may provide the user options to choose to user the source, destination or merge the header information when pasted. Other paste operations that insert the table with headers as an image, as a file, as an attachment have also been contemplated. In addition to pasting using a graphical user interface, one or more of the multiple pasting options may be invoked by keyboard keystrokes, mouse clicks, onscreen touch enabled buttons, user interface that supports gestures, etc. Another way to perform the copy and paste is to select cells or data in the first document using a mouse or touch input and drag or swipe gesture to a destination location to indicate where the paste should occur.

In other embodiments, in response to the request to paste, the data and by association the cells containing the column's or row's header, or other labeling information can be directly copied to a destination application along with the data without having to copy the information to the clipboard first. The information may also be optionally copied to the clipboard at that time. The destination location may be identified by a cursor or mouse position or representation that can be moved around before it is dropped into place.

In some embodiments, the user can select a destination copy from source to destination adding the additional header information that was not included in the original selection. The copy and paste actions, in some embodiments, may use a clipboard to store a temporary copy of the data. In some embodiments, a software application may directly copy the source to the destination without copying to a clipboard or other intermediate storage location. The copy operation can place the cells with additional header information into a buffer available for pasting and a paste operation can select the data and metadata to paste into fields in the destination location.

Embodiments of the present invention also include computer-readable storage media containing sets of instructions to cause one or more processors to perform the methods, variations of the methods, and other operations described herein.

Some embodiments provide for a system having one or more processors, computer readable media, and office productivity applications (e.g., spreadsheets). The application can be stored on the one or more computer readable media, and include program instructions which, when executed by the one or more processors, direct the one or more processors to identify (e.g., software object interface, based on location, formatting or other characteristic) a set of corresponding cells within the first table that include labeling information corresponding to the one or more cells selected by a user. The processors can then then be directed to copy the set of corresponding cells with the labeling information and the data from the one or more cells to a clipboard. The clipboard may be an operating system clipboard, an application clipboard created using a plug-in on browser running on a client device, or other clipboard. In response to a request to paste, the processors can create a second table having cells that include the set of cells with the labeling information and the data from the one or more cells within the first table.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which.

Figure 1:
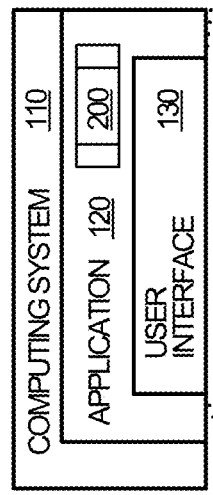
FIG. 1 illustrates an example of an environment capable of implementing enhanced copy and paste operations in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to smarter copy and paste functionality. More specifically, some embodiments relate to an intelligent cut and paste feature for tables where headers/labels are automatically determined or dynamically generated and incorporated in the copied cells even if those headers (or meta data description) were not selected for copying. Users of tables often create column labels, row labels, titles and the like to help readers understand the data being displayed in the table. In traditional copy and paste operations acting on an interior subset of the table's data, this information is often not manually selected for copying which leaves the pasted data without context. As a result, users of traditional copy and paste features have to either leave the isolated data that was pasted in that form without the headers and labels, manually create new headers and labels, or perform additional copy and paste operations to capture the headers and labels.

In contrast, various embodiments eliminate these additional user interactions by automatically identifying the headers when the headers were not part of the data or cells selected for copying or dynamically generating the headers when desired by the user. As a result, the copied data along with the automatically identified headers can be copied to a clipboard on a system, application, hosted in the cloud, specific application/browser functionalities, etc. Moreover, various embodiments of this enhanced copy and paste functionality can be especially useful for large tables and scenarios on a limited screen device, such as on a mobile phone. In some embodiments, if a column of data includes a function or a function that acts on some of the selected data (e.g., a sum at the bottom of a column), then the copy/paste can be modified so that an automatically created header or label can be inserted. For example, the automatically created header or label could be something like a "Sum of State Cost," "Average Temperature of A thru Z," etc. In addition, some embodiments of this copy and paste functionality can be applied to spreadsheet applications, word processing applications, e-mail applications, and/or other applications where tables may be created and/or pasted.

Various embodiments of the present technology provide for a wide range of technical effects, advantages, and/or improvements to computing systems and components. For example, various embodiments include one or more of the following technical effects, advantages, and/or improvements: 1) reducing the number of user interactions when copying data; 2) automatically identifies additional data a user may desire be copied along with a selected data set; 3) creates a new format for storing data with a clipboard or memory; 4) creating improvements to the way computing devices operate; 5) use unconventional and non-routine operations as part of the copy and paste process to automatically identify headers/labels or automatically create a descriptive header, store the data on a clipboard and reconstruct new tables with adjacent headers and copied data; 6) use of additional graphical user interfaces for selecting between various pasting options enabled by the enhanced copy/paste tools; and/or 7) changing the manner in which a computing system reacts to a request to copy and paste data (e.g., headers can be automatically identified, separating and storing of complex data, reconstruction of data based on user inputs, etc.). Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to creating smarter copy and paste functionality with tables, embodiments of the present technology are equally applicable to various other copy and paste application pairings such as, but not limited to, copying a portion of an e-mail body and automatically identifying and copying a subject line from the e-mail. Similarly, in some embodiments other types of information may be automatically collected instead of, or in addition to, the headers. Examples include, but are not limited to, file name, date/time of copy/paste request, user information (e.g., initials), titles, headings, and/or other information that may be beneficial. Additionally, in some embodiments the copy and paste operation can interoperate between a graphical user interfaces like spreadsheet tools and what are traditionally considered non-graphical user interfaces such as command line interfaces such the text editor vi (currently available at ex-vi.sourceforge.net), Microsoft Windows PowerShell, and the Unix Bash shell.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an environment 100 capable of implementing enhanced copy and paste operations in accordance with some embodiments of the present technology. Implementation 100 involves computing system 110 on which application 120 runs. When executing, application 120 drives a user interface 130 through which a user may interact with the application.

Figure 7:
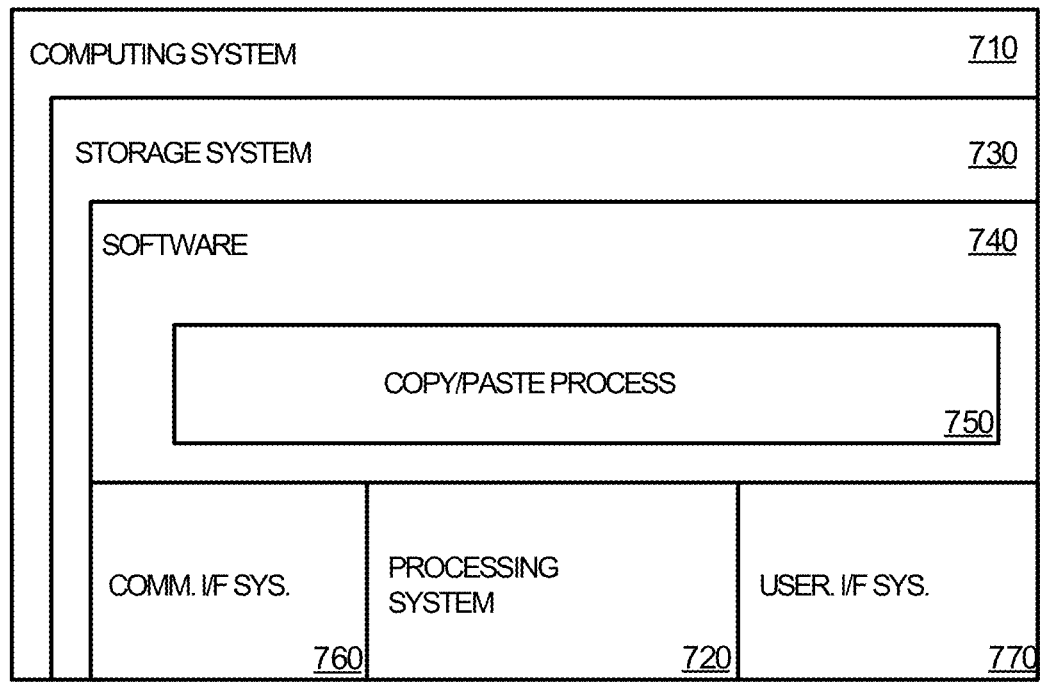
FIG. 7 illustrates an example of a computing system, which is representative of any system or collection of systems in which the various applications, services, scenarios, and processes disclosed herein may be implemented.

Computing system 110 is representative of any computing system capable of running an application natively or in the context of a web browser, streaming an application, or executing an application in any other manner Examples of computing system 110 include, but are not limited to, personal computers, mobile phones, tablet computers, desktop computers, laptop computers, wearable computing devices, thin client computing devices, virtual machine hosting a computing environment, distributed application, server computer, computing cluster, application hosted as software as a service (SaaS), application running on a platform as a service (PaaS), application running on an infrastructure as a service (IaaS) or any other form factor, including any combination of computers or variations thereof. Computing system 110 may include various hardware and software elements in a supporting architecture suitable for providing application 120. One such representative architecture is illustrated in FIG. 7 with respect to computing system 710.

Application 120 is representative of any software application capable of creating data that can be copied and pasted. Examples include, but are not limited to, spreadsheet applications, word processing applications, presentation applications, email applications, social networking applications, gaming applications, business management applications, note taking applications, video or image editing applications, and any other type of combination, variation, or combination thereof. Application 120 may be implemented as a natively installed and executed application, a browser-based application, a streaming or streamed application, a mobile application, or in any other suitable manner.

Application 120 may monitor user interface 130 for a selection of cells 140 within table 150. In the examples illustrated in FIG. 1, user interface 130 includes a view of a spreadsheet workbook hosted by application 120. The view of the spreadsheet workbook includes a canvas 160a-160c with cells 140 defined by rows and columns. In this scenario, two columns of data have been entered in cells 140 with headers of in cells b1 and c1 with labels "date" and "qty.," respectively. As a user interaction occurs with respect to user interface 130 one or more of the cells can be selected. The user interaction may be, for example, a touch, mouse click, voice command, keyboard keystrokes, combination of one or more of these interactions or other such interaction. As illustrated in canvas 160b, cells 4b-6c have been selected by the user. In this case, the user did not select the cells with the headers in cells b1 and c1.

After selection of the cells, the user can request that the cells be copied and then pasted in a new location. In accordance with various embodiments, the copy operation copies not only the cells selected by the user, but also any cells with header information even though they may have not been selected by the user. When the user requests the cells be pasted, the selected cells along with the automatically identified headers are pasted as illustrated in canvas 160c.

Figure 2:
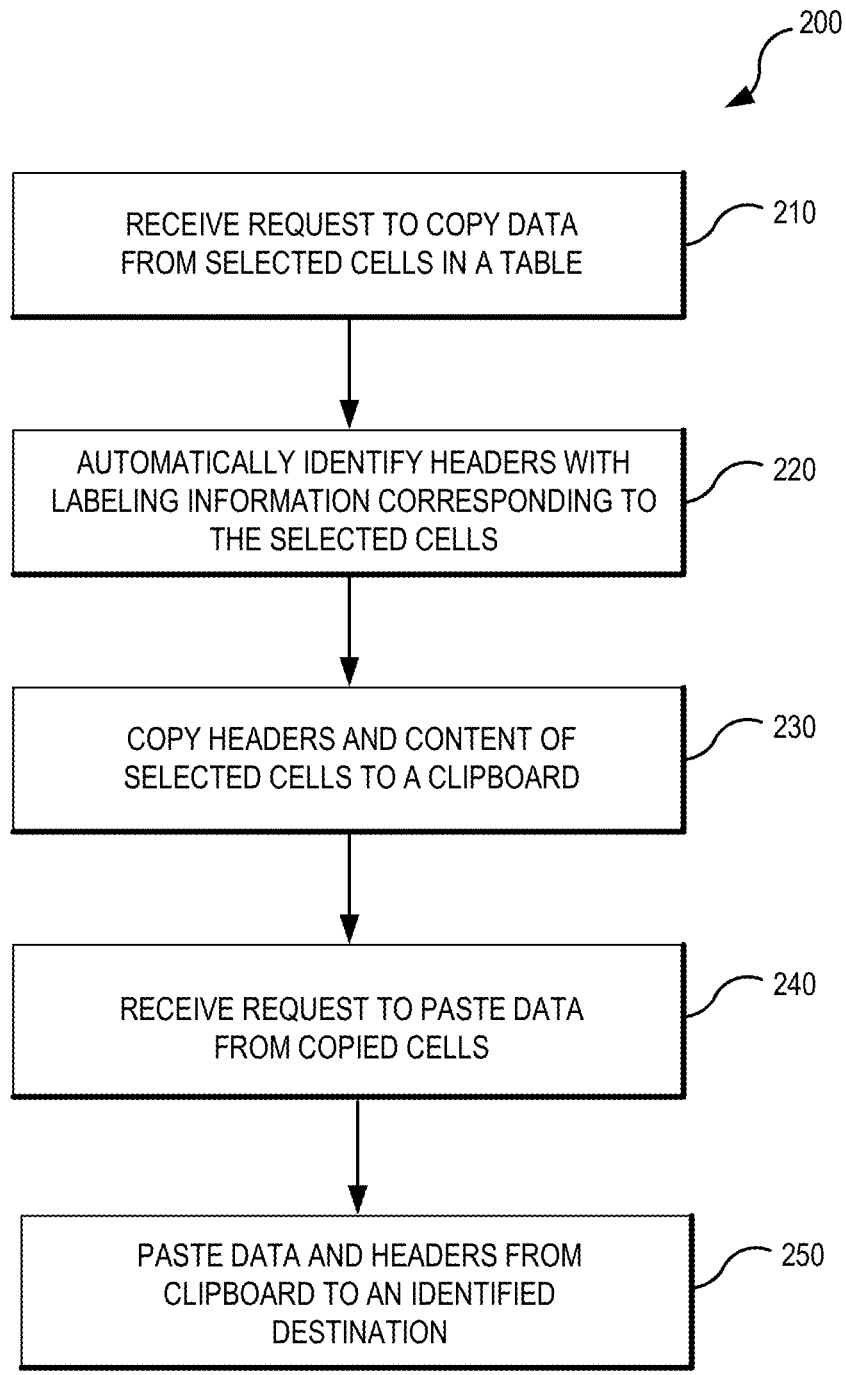
FIG. 2 illustrates an example of a set of operations for an enhanced copy and paste according to one or more embodiments of the present technology.

FIG. 2 illustrates an example of a set of operations 200 for an enhanced copy and paste according to one or more embodiments of the present technology. Some or all of the steps of the enhanced copy and paste process 200 may be implemented in program instructions in the context of the component or components of the application or utilities used to carry out the copy and paste actions. In some embodiments, the copy/paste feature can be built into the office application (e.g., Excel) or be implemented by a Visual Basic for Applications (VBA) or macro script added by the user or vendor to the application.

During receiving operation 210 a request to copy data can be detected or received. For example, the data may be from a selected portion of a table created in application 120. Identification operation 220 automatically identifies any headers with labeling information corresponding to the selected cells. In accordance with various embodiments, the headers can be identified using a variety of techniques using location, attribute, features and/or other characteristics that may be commonly associated with headers. For example, headers are often located in the first row or column. In addition, users may adjust one or more attributes (e.g., background color, font type, font size, font position, etc.) to emphasize the headers. As another example, users can adjust other characteristics of the cells with the headers (e.g., by adding filters or other functionality).

In accordance with various embodiments, the application may store the table in a memory layout that facilitates accessing the table data and header information. The application may employ an object-oriented design that includes a table object that keeps track of the cells containing data and/or headers and may provide one or more methods to store and access the table's values and headers. The table object itself may contain the information or references to the memory containing the data and header information. As such, identification operation 220 may use the locations, attributes, table object data and methods, features and/or other characteristics, alone or in combination (e.g., via a weighted combination), to automatically identify headers of the selected data.

Copy operation 230 can copy the headers and the content of the selected cells to a clipboard (e.g., an application clipboard, operating system clipboard, etc.). Once receiving operation 240 receives or detects a request to paste date from the copied cells, pasting operation 250 pastes the data and the headers, which were not selected by the user, to an identified destination in the same application or another application. In some embodiments, the headers may be placed immediately adjacent to the data even though the headers were not adjacent to the selected data in the original table. In other embodiments, the copy and paste operation may be combined to directly copy the data and respective header or label information to the destination application on user command and optionally copy the data to the clipboard for future use.

Figure 3A:
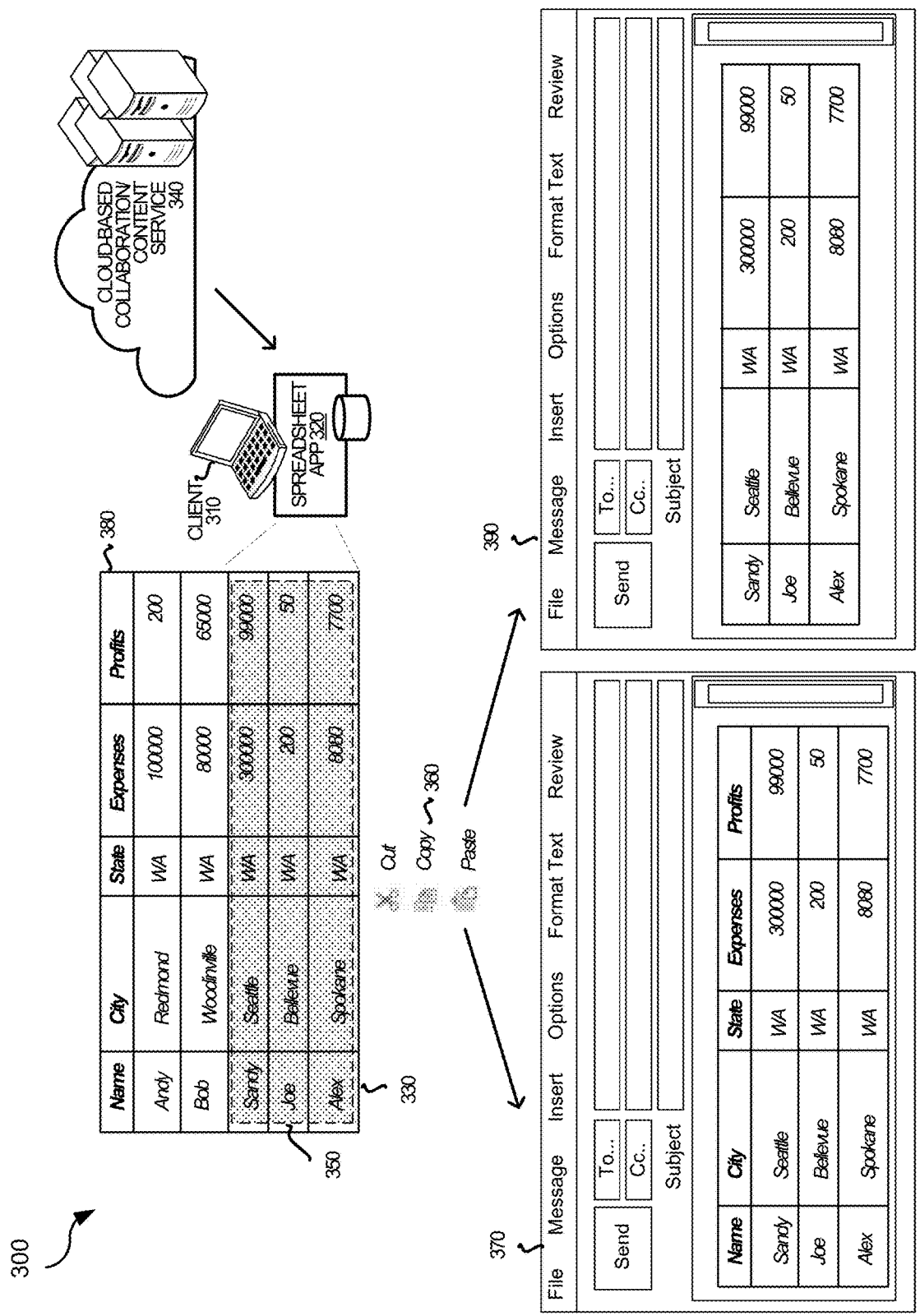
FIGS. 3A-3B illustrate a set of components associated with a cloud-based collaboration service supporting an enhanced copy and paste that may be used in one or more embodiments of the present technology.

FIG. 3A illustrates a set of components associated with a cloud-based collaboration service supporting an enhanced copy and paste that may be used in one or more embodiments of the present technology. As illustrated in FIG. 3A, client device 310 runs a spreadsheet application 320 that can access a workbook 330 from a collaboration or content service 340. The collaboration or content service 340 is representative of any service providing shared access to cloud-based or centralized content and centralized storage for workbooks such as, for example, Microsoft® Office 365, Microsoft® SharePoint® Online (SPO) services, SharePoint®, a shared network drive, or the like. As shown in the example of FIG. 3, workbook 330 can be opened on client device 310 with spreadsheet application 320. The spreadsheet application 320 can include functionality including GUIs (graphical user interface) running on client device 310, e.g., a PC, mobile phone device, a Web server, or other application servers. Such systems may employ one or more virtual machines, containers, or any other type of virtual computing resource.

A user can select a portion 350 of workbook 330 using standard cell selection techniques (keystrokes, mouse inputs, touch inputs, combination of aforementioned, etc.) and request that portion 350 be copied using menu 360 or other command interface (e.g., keyboard shortcut, voice command, etc.). The user can then request, e.g., using menu 360 or other command interface, that portion 350 be pasted into a new location. In accordance with some embodiments, there may be multiple options for how portion 350 is pasted. For example, one option shown in e-mail 370 may include headers 380 that were not selected by the user while another option shown in e-mail 390 include only the data from portion 350 selected by the user.

Figure 3B:
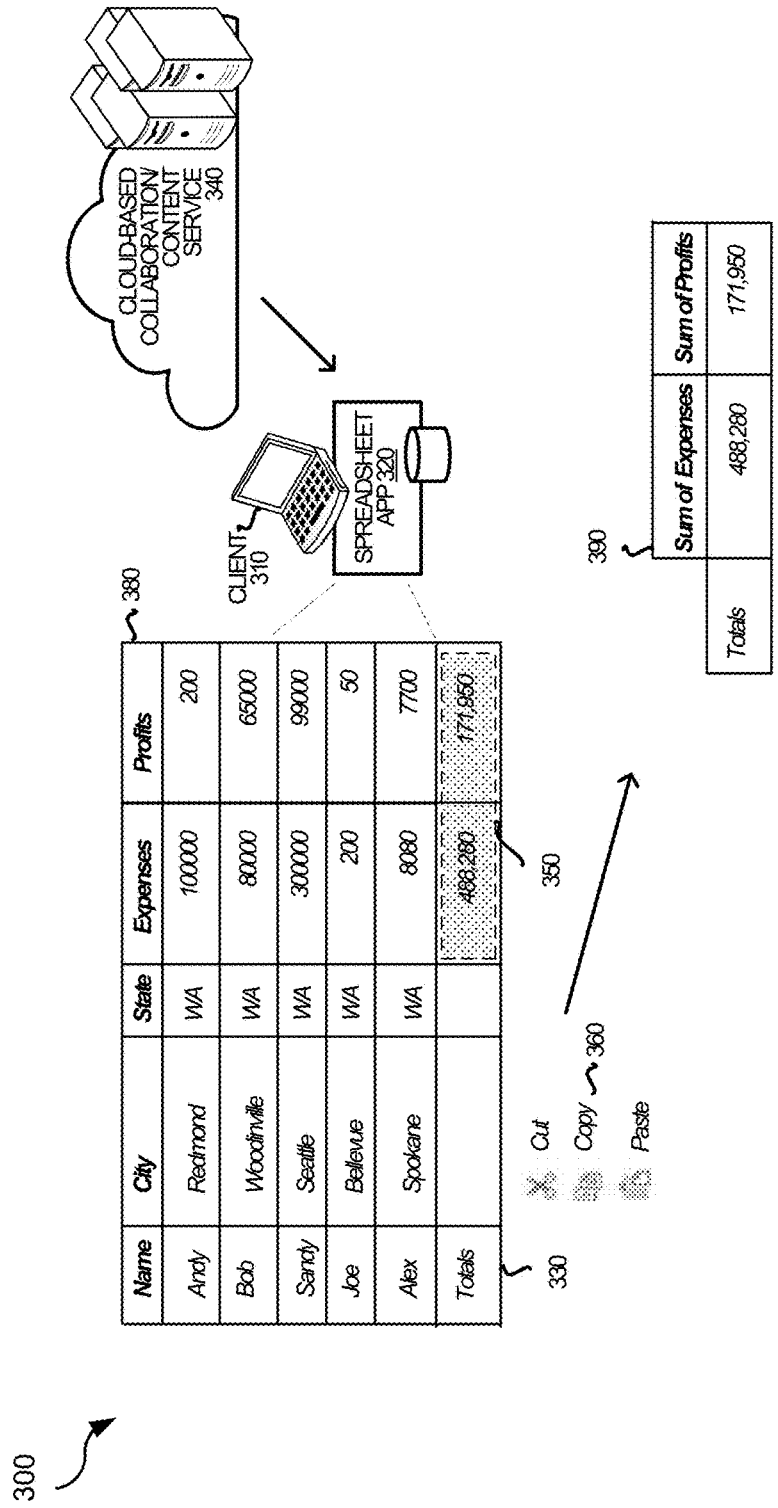

FIG. 3B illustrates client device 310 running spreadsheet application 320 that can access a workbook 330 from a collaboration or content service 340. A user can select a portion 350 of workbook 330 where the headers are located at the beginning of a row. The selection of a row data value to be copied could include the row header information and/or column header information as illustrated in pasted table 390. As such, in accordance with various embodiments, the header or description does not have to located at the top or right most portion of a table. Instead, headers or descriptions can be located adjacent to the table to associated with the values being copied In some embodiments, a user may copy a data value from a source document (e.g., workbook 330) that is the output of a function, such as a cell that added up a column of data values with the header "Expenses" or "Profits" as shown by 350 in FIG. 3B. When the value is pasted into a destination the header can be dynamically generated or modified, in some embodiments. The dynamically generated headers and label for the paste data can be created from the sum function in 350 and header information 380 and combined and shown as the "Totals", "Sum of Expenses" and "Sum of Profits" in 390 of FIG. 3B. For example, instead of just grabbing the "Totals" header, or if it didn't exist, the paste function could insert a header such as "Sum of 6 values," "Total Expense (Sum F6:F10)," "Total of 6 Values," or the like. As another example, if a table had twenty-six alphabetical rows names for the NATO phonetic alphabet (Alfa, Bravo, etc. ending in Yankee and Zulu) and each row had a data value of each term's usage, and a sum at the bottom of the table below the data values, when the column sum of the data values was copied and pasted, some embodiments would dynamically generate a table heading or metadata descriptor such as "Sum of Alfa thru Zulu" when pasted. Other embodiments could paste the descriptor of the function such as "SUM (B1:B26)" or "Sheet2!SUM(B1:B26)" or something similar providing a description of the data, such as what the data means and/or where the data came from. Other examples could include copying and pasting from a photo online and providing a footnote or metadata describing where the image came from, or an html <img> tag's alt attribute value i.e. alt="Sum Alfa thru Zulu Usage Values" etc.

Figure 4:
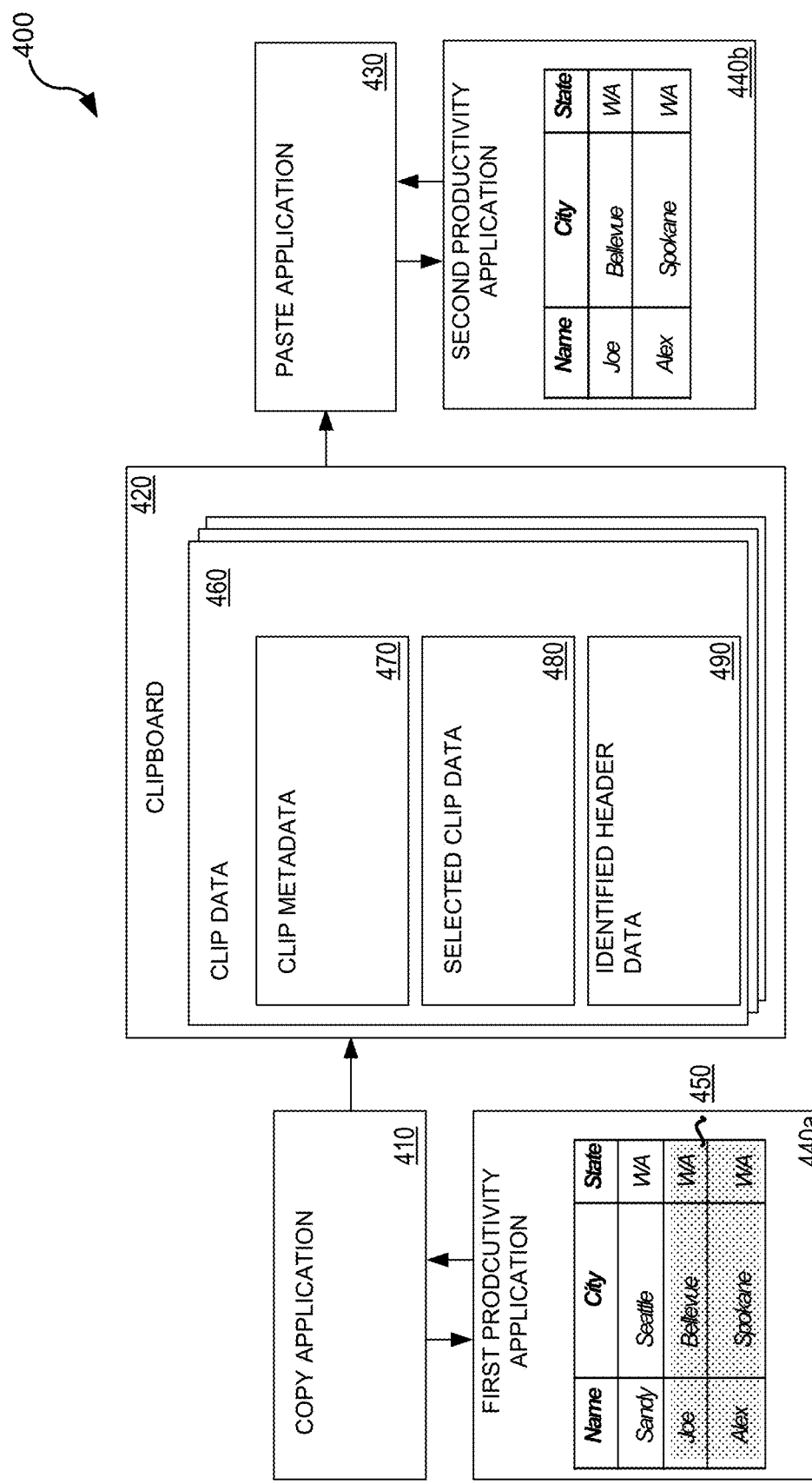
FIG. 4 illustrates a set of components that may be used according to one or more embodiments of the present technology.

FIG. 4 illustrates a set of components 400 that may be used according to one or more embodiments of the present technology. According to the embodiments shown in FIG. 4, the system can include copy application 410, clipboard 420, paste application 430, and one or more productivity applications 440a-440b. Copy application 410 can provide the data for copying and paste application 430 accepts the data for pasting. Each of these applications or modules can be part of operating system utilities, cloud-based platforms (e.g., accessed via a webpage or other portal), productivity applications, a feature of a larger application like a spreadsheet or word processing application, and the like.

In one embodiment, the Microsoft Foundation Class (MFC) Library provides two classes, the Data Sources (COleDataSource objects) represent the source side of the data transfer 410 to 420 and Data object (COleDataObject objects) represent the destination side of the data transfer from 420 to 430. How to use these software objects and interfaces to copy and paste information that adds an additional data format type to and from the clipboard is fully described by Microsoft Developer Network MSDN documentation "OLE in MFC" (available at URL:https://msdn.microsoft.com/en-us/library/df267wkc.aspx and incorporated by reference) including sub topics "Clipboard: Copying and Pasting Data" (URL: https://msdn.microsoft.com/en-us/library/2ca18w7k.aspx incorporated by reference) and "Data Object and Data Sources (OLE)" available at URL https://msdn.microsoft.com/en-us/library/w1c8ka59.aspx incorporated by reference). Other embodiments of the present technology may include some, all, or none of these modules and components along with other modules, applications, and/or components. Still yet, some embodiments may incorporate two or more of these modules, applications, and components into a single module or application and/or associate a portion of the functionality of one or more of these modules with a different module or application. For example, in one embodiment, copy application 410 and paste application 430 can be combined into a single copy/paste application. In some embodiments, the clipboard can be a system wide or local application specific clipboard.

A user can select data from table 450 in application 440a. Upon requesting the data be copied, copy application 410 identifies the user selected data along with the headers and copies both into clipboard 420. Clipboard 420 can store a variety of data types, such as, but not limited to text strings, data structures, text and binary stream data, and even application assets. Clipboard data can be classified using various mechanisms such as Multipurpose Internet Mail Extensions (aka MIME types) which follow the Internet Engineering Task Force Request for Comments RFC 2045 (available at www.ietf.org/rfc/rfc2045.txt and incorporated by reference) and RFC 2046 (available at www.ietf.org/rfc/rfc2045.txt and incorporated by reference). Clipboard 420 can store multiple copies of the data in individually enumerated buffers with descriptors for the data stored in each buffer. The copy buffers may be enumerated and identified by well-known identifiers (ID's) (such as those documented by MSDN "Clipboard Formats" available at https://msdn.microsoft.com/en-us/library/windows/desktop/ms649013 (v=vs.85). aspx#_win32_Standard_Clipboard_Formats and incorporated by reference), MIME types or support custom data formats denoted by custom identification (ID) identifiers including an embodiment taught by MSDN "Clipboard: Adding Other Formats" (available at URL: https://msdn.microsoft.com/en-us/library/838a3whf.aspx and incorporated by reference), private clipboard formats only understood by certain applications, etc.

Clipboard 420 can copy the data to the buffers on the copy command in various formats filling the appropriate buffer, or be deferred and simply keep track of the data marked for copy which is then performed when the data is pasted to a destination and the destination application requests the buffer or buffers from the application performing the copy operation. Clipboard 420 can be implemented by an application that will provide the data buffers to another application that requests the copy buffer or buffers available. In accordance with various embodiments, copy application 410, clipboard 420, and/or paste application 430 may be implemented in a variety of ways including, but not limited to, java script (e.g. as a plug in to a browser or productivity suite), web-based, operating system utilities, application features, etc.

Copy application 410 and clipboard 420 may store the data in different ways depending on the data type. In some embodiments, the data may be split into different portions for complex data. For example, simple text data can be stored directly in clipboard 420, while more complex data can be stored using references that paste application 430 can resolve and use to reconstruct the data in a desired format. In some embodiments, clip data 460 can include metadata 470, selected clip data 480 and identified header data 490. Using this type of organization, paste application 430 can access parts of the data that are needed and reconstruct the data for pasting, possibly in alternate formats as requested by a user. For example, paste application 430 may paste just the clip data, paste the selected data in the table format, paste the selected data adjacent to identified headers (see, e.g., the table illustrated in application 440b), or paste as text with the headers, paste the entire table of data but hide the cells not selected in the copy operation, etc.

As another example, the text from table 450 could be XML or HTML table markup that gets copied to clipboard 420. A copy/paste of HTML in the middle of a set of data results in the data being copied to clipboard 420 in a reduced format. The table text can be loaded on the clipboard for the copy/paste when going from a five column and five row table where the user selects only the middle three rows. As a result, the paste application 430 grabs the header row and the three body rows from clipboard 420 (e.g., from selected clip data 480 and identified header data 490) and formats valid HTML output. Paste application 430 may also fixup the table representation for the table by formatting for three rows and a header, instead of five rows and a header as in the original table. Alternatively, the HTML markup could comment out the data cells not selected in the copy operation even if the values are copies so that they could be restored later on if the user chooses to unhide the cells.

Figure 5:
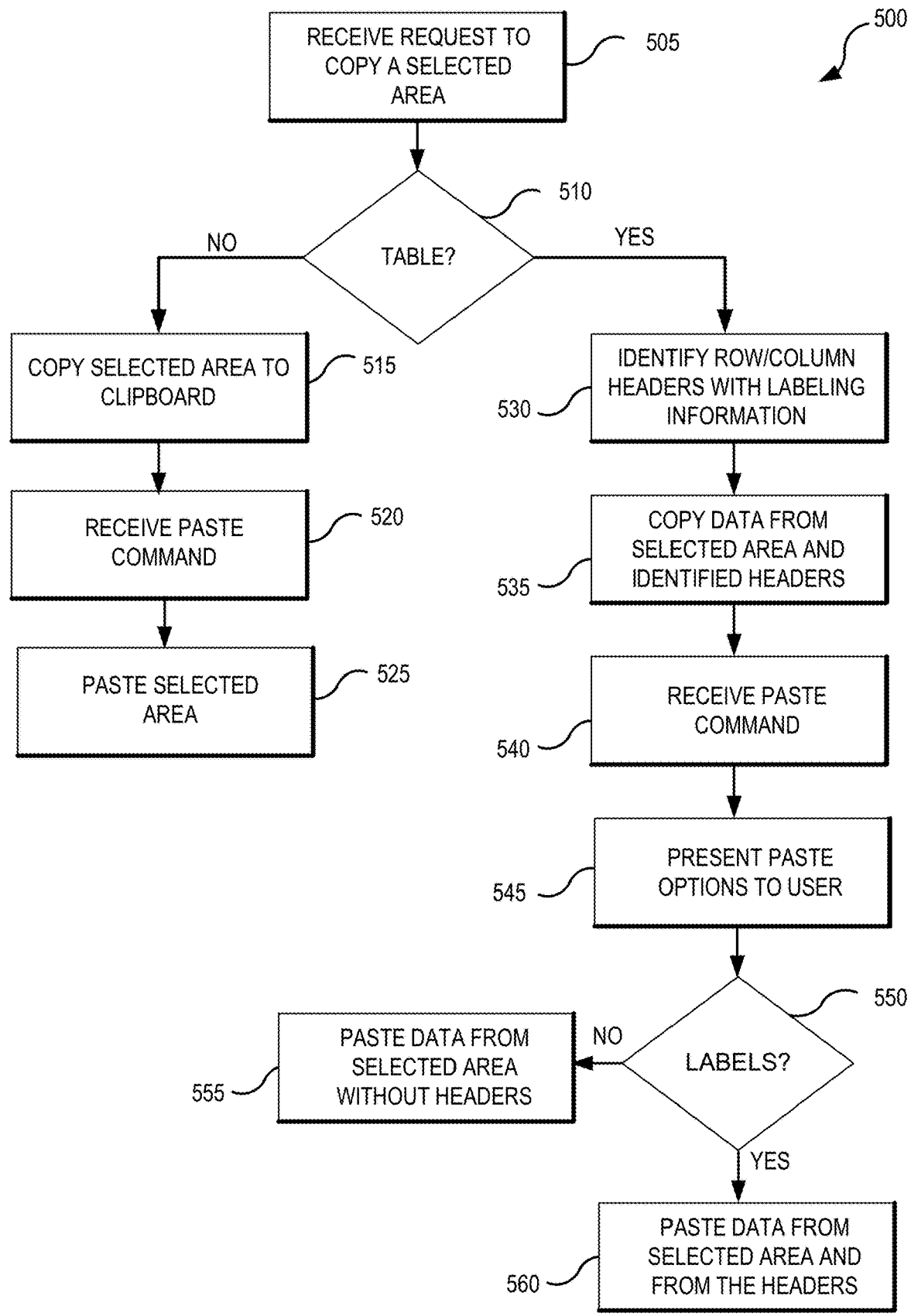
FIG. 5 illustrates an example of a set of operations for allowing a user to paste data with or without additionally identified information in accordance with some embodiments of the present technology.

FIG. 5 illustrates an example of a set of operations 500 for allowing a user to paste data with or without additionally identified information (e.g., headers) in accordance with some embodiments of the present technology. As illustrated in FIG. 5, receiving operation 505 detects a request to copy a selected area. In response to detecting the request to copy a selected area, determination operation 510 determines whether the selected area was part of a table. In some embodiments, the copy and/or paste functions can programmatically query if the selected area are members of a table object and if so identify the header values. Other embodiments can examine other attributes of the data cells formatting, location and other metadata mentioned earlier as ways to identify headers and other labeling information. If determination operation 510 determines that the selected area was not part of a table, then determination operation 510 branches to copy operation 515 where the selected area is copied to a clipboard. When a request to past the data is detected during receiving operation 520, pasting operation pastes the selected area.

If determination operation 510 determines that the selected area was part of a table, then determination operation 510 branches to identification operation 530 where row and column headers that contain labeling information are identified. Then, copy operation 535 copies data from the selected area and from the identified headers. When receiving operation 540 receives a paste command, presentation operation 545 follows which presents the user with multiple paste options (e.g., to paste with headers or without headers). Labeling operation 550 determines which option the user has selected. When labeling operation 550 determines that the user has selected to paste the data without the labels, then labeling operation 550 branches to pasting operation 555 where only the data from the selected area is pasted. When labeling operation 550 determines that the user has selected to paste the data with the labels, the labeling operation 550 branches to pasting operation 560 where data from the selected area and from the identified headers are pasted.

While not illustrated in FIG. 5, various embodiments allow for an additional function identification operation (e.g., between determination operation 510 and before identification operation 530 or between identification operation 530 and copy operation 535) to determine if a cell being copied contains a function. If the function identification operation, identifies a function within one of the cells being copied, then function identification operation can branch to a generation operation to generate a header for the cell when the data is copied to the clipboard. Then a paste operation could include an autogenerated header or label. For example, the generated header could be "SUM(B1:B26)" or other metadata applicable label could be applied in a suitable location on the paste operation. In other embodiments, when the user selects a data cell from the table to copy the application automatically selects the column header to indicate to the user that the header will be copied along with the data contained in the cells. The header information, in some embodiments, may be a description at the beginning of the row instead of at the top of the column. The row header information could be copied and pasted during the selection process instead of a column header.

Figure 6:
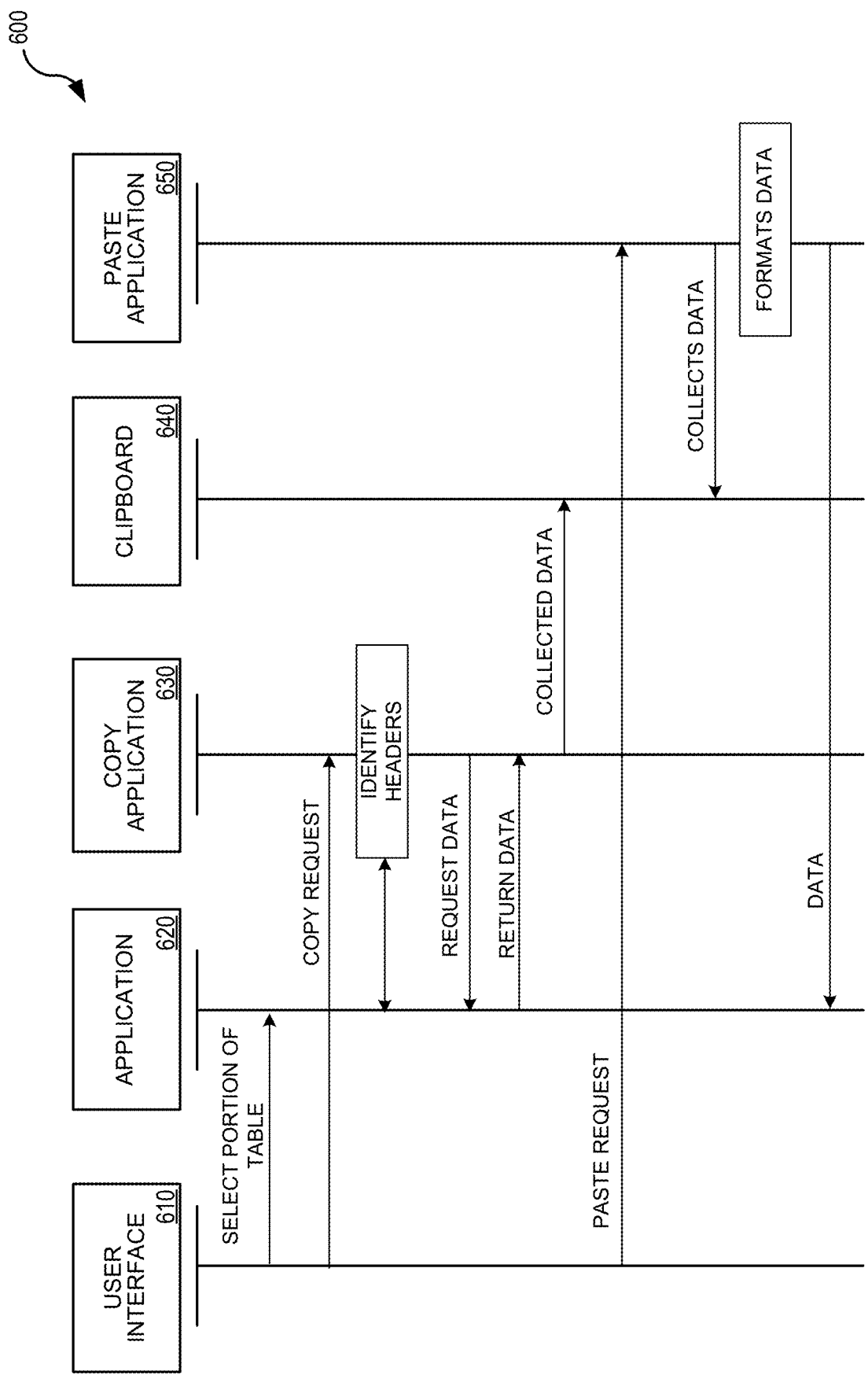
FIG. 6 is a sequence diagram illustrating an example of the data flow between various components according to various embodiments of the present technology.

FIG. 6 is a sequence diagram 600 illustrating an example of the data flow between various components according to various embodiments of the present technology. As illustrated in FIG. 6, a user utilizes user interface 610 to select a portion of a table in application 620. Then, the user requests via user interface 610 a copy request which is detected by copy application 630. In response to the copy request, copy application 630 identifies headers associated with the selected portion of the table within application 620 and requests data from application 620. Application 620 returns the data to copy application 630 which then formats the data for storage on clipboard 640. When the user requests the data be pasted, paste application 650 collects the data from the clip board, formats the data, and pastes the data at the desired location within application 620.

FIG. 7 illustrates computing system 710, which is representative of any system or collection of systems in which the various applications, services, scenarios, and processes disclosed herein may be implemented. For example, computing system 710 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 710 may be implemented as a single apparatus, system, or device or may be implemented in a distributed manner as multiple apparatuses, systems, or devices. Computing system 710 includes, but is not limited to, processing system 720, storage system 730, software 740, applications for copy/paste process 750, communication interface system 760, and user interface system 770. Processing system 720 is operatively coupled with storage system 730, communication interface system 760, and an optional user interface system 770.

Processing system 720 loads and executes software 740 from storage system 730. When executed by processing system 720 for deployment of scope-based certificates in multi-tenant cloud-based content and collaboration environments, software 740 directs processing system 720 to operate as described herein for at least the various processes, operational scenarios, and sequences discussed in the foregoing implementations. Computing system 710 may optionally include additional devices, features, or functionality not discussed for purposes of brevity.

Referring still to FIG. 7, processing system 720 may comprise a micro-processor and other circuitry that retrieves and executes software 740 from storage system 730. Processing system 720 may be implemented within a single processing device, but may also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 may comprise any computer readable storage media readable by processing system 720 and capable of storing software 740. Storage system 730 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 730 may also include computer readable communication media over which at least some of software 740 may be communicated internally or externally. Storage system 730 may be implemented as a single storage device, but may also be implemented across multiple storage devices or sub-systems co-located or distributed relative to each other. Storage system 730 may comprise additional elements, such as a controller, capable of communicating with processing system 720 or possibly other systems.

Software 740 may be implemented in program instructions and among other functions may, when executed by processing system 720, direct processing system 720 to operate as described with respect to the various operational scenarios, sequences, and processes illustrated herein. For example, software 740 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or application software. Software 740 may also comprise firmware or some other form of machine-readable processing instructions executable by processing system 720.

In general, software 740 may, when loaded into processing system 720 and executed, transform a suitable apparatus, system, or device (of which computing system 710 is representative) overall from a general-purpose computing system into a special-purpose computing system. Indeed, encoding software on storage system 730 may transform the physical structure of storage system 730. The specific transformation of the physical structure may depend on various factors in different implementations of this description. Examples of such factors may include, but are not limited to, the technology used to implement the storage media of storage system 730 and whether the computer-storage media are characterized as primary or secondary storage, as well as other factors.

For example, if the computer readable storage media are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 760 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 770 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 770. In some cases, the input and output devices may be combined in a single device, such as a display capable of displaying images and receiving touch gestures. The aforementioned user input and output devices are well known in the art and need not be discussed at length here. In some cases, the user interface system 770 may be omitted when the computing system 710 is implemented as one or more server computers such as, for example, blade servers, rack servers, or any other type of computing server system (or collection thereof).

User interface system 770 may also include associated user interface software executable by processing system 720 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 710 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A data storage device having instructions stored thereon instructions that when executed by one or more processors cause a machine to:
   receiving a request to copy data, wherein the data is part of a table having rows and columns;

dynamically generate a set of header cells corresponding to the data based on content of cells requested to be copied,
create an entry in a clipboard corresponding to the data and the set of header cells; and
paste the data and the set of header cells in a destination location.

2. The data storage device of claim 1, further comprising instructions that when executed by the one or more processors further cause the machine to generate a graphical user interface that can be displayed on a client device, wherein the graphical user interface includes:
a first option to paste that upon selection creates a second table that includes the set of header cells and the data; and
a second option to paste that creates a third table with only the data.

3. The data storage device of claim 1, wherein the instructions when executed by the one or more processors cause the machine to paste the data in a second table that positions the set of header cells adjacent to the data.

4. The data storage device of claim 1, wherein the table is located within a spreadsheet application and the destination location is in a second application.

5. The data storage device of claim 1, wherein the entry in the clipboard includes different data structures with metadata, the data identified in the request to copy data, and the set of header cells dynamically generated and wherein the different data structures are accessed by a paste application which then formats the metadata, data, and the set of header cells before pasting to the destination location.

6. The data storage device of claim 1, wherein the clipboard is an application clipboard or an operating system clipboard.

7. The data storage device of claim 1, wherein the instructions when executed by the one or more processors cause the machine to dynamically generate the set of header cells by generating a metadata descriptor based on a function used to create the data.

8. A method for copying and pasting data from a first table, the method comprising:
identifying a set of cells within the first table that includes labeling information related to data from within the first table;
creating modified labeling information based on content in the set of cells within the first table;
copying the set of cells and the modified labeling information and the data from the set of cells to create an entry in a clipboard,
wherein the entry in the clipboard includes different data structures with metadata, the data, and the modified labeling information, and
wherein the different data structures are accessed by a paste application which then formats the metadata, the data, and the modified labeling information before pasting to a destination location; and
creating, using the paste application, a second table having cells that include the modified labeling information and the data from the set of cells within the first table.

9. The method of claim 8, further comprising generating, in response to a request to paste, a graphical user interface that can be displayed on a client device, wherein the graphical user interface includes:
a first option to paste that upon selection creates the second table that includes the modified labeling information and the data from the set of cells within the first table; and
a second option to paste that creates a third table with only the data from the set of cells within the first table.

10. The method of claim 8, wherein the second table positions the modified labeling information adjacent to the data from the set of cells pasted from the first table.

11. The method of claim 8, wherein creating the modified labeling information includes searching for cells within the first table that is formatted differently from the set of cells.

12. The method of claim 8, wherein the first table is located within a spreadsheet application and the second table is created in a second application.

13. The method of claim 8, wherein the first table is located within an e-mail and creating the modified labeling information includes automatically identifying and copying a subject line from the e-mail.

14. The method of claim 8, wherein the first table is created in a spreadsheet application hosted on a cloud-based service and the clipboard is a plugin created in a thin client.

15. A system comprising:
one or more processors;
one or more computer readable media; and
an application stored on the one or more computer readable media, the application including program instructions which, when executed by the one or more processors, direct the one or more processors to:
copy data from a location identified in a copy request, wherein the location comprises a table having rows and columns;
automatically generate a set of header cells based on the data identified in the copy request; and
create a copy of the data that includes the data copied from the location and the automatically generated set of header cells.

16. The system of claim 15, wherein the program instructions further direct the one or more processors to automatically generate descriptors of the data identified in the copy request, wherein the copy of the data further includes the automatically generated descriptors of the data.

17. The system of claim 16, wherein the descriptors of the data are automatically added to the copy of the data as one of a footnote and metadata describing where the data originated from.

18. The system of claim 17, wherein the data includes an image copied from a webpage.

19. The system of claim 15, wherein the application is a spreadsheet application and the data include content from a first table is located within the spreadsheet application and the copy of the data is a second table created in a second application.

20. The system of claim 15, wherein the application is an e-mail application and the data include content from a body of an e-mail.

* * * * *